US012084361B2

(12) United States Patent
Yoon et al.

(10) Patent No.: US 12,084,361 B2
(45) Date of Patent: Sep. 10, 2024

(54) APPARATUS AND METHOD FOR CONTROLLING WATER SOFTENER

(71) Applicant: KYUNGDONG NAVIEN CO., LTD., Gyeonggi-do (KR)

(72) Inventors: Ji Hyung Yoon, Seoul (KR); Soo Young Lee, Seoul (KR)

(*) Notice: Subject to any disclaimer, the term of this patent is extended or adjusted under 35 U.S.C. 154(b) by 764 days.

(21) Appl. No.: 17/075,271

(22) Filed: Oct. 20, 2020

(65) Prior Publication Data

US 2021/0114898 A1 Apr. 22, 2021

(30) Foreign Application Priority Data

Oct. 22, 2019 (KR) .................. 10-2019-0131716
Sep. 25, 2020 (KR) .................. 10-2020-0124816

(51) Int. Cl.
*C02F 1/42* (2023.01)

(52) U.S. Cl.
CPC ...... *C02F 1/42* (2013.01); *C02F 2201/46135* (2013.01); *C02F 2209/05* (2013.01); *C02F 2209/10* (2013.01); *C02F 2209/40* (2013.01); *C02F 2209/44* (2013.01)

(58) Field of Classification Search
CPC ............. C02F 1/42; C02F 2201/46135; C02F 2209/05; C02F 2209/10; C02F 2209/40; C02F 2209/44; C02F 2209/006; C02F 1/008; C02F 1/4691; C02F 2201/46145; C02F 2201/4615; C02F 1/4693; C02F 1/4695; C02F 1/4696; C02F 5/00
See application file for complete search history.

(56) References Cited

U.S. PATENT DOCUMENTS

| 2014/0083846 | A1 | 3/2014 | Moon et al. |
| 2014/0102902 | A1 | 4/2014 | Son et al. |
| 2014/0353167 | A1 | 12/2014 | Cho et al. |
| 2017/0369340 | A1 | 12/2017 | Son et al. |
| 2019/0112201 | A1* | 4/2019 | Branum ................ G01N 33/18 |

FOREIGN PATENT DOCUMENTS

| CN | 101712500 A | 5/2010 |
| CN | 103562139 A | 2/2014 |
| CN | 103582614 A | 2/2014 |

(Continued)

OTHER PUBLICATIONS

1st Office Action for corresponding Chinese Patent Application No. 202011137371.6, dated Aug. 12, 2022, 18 pages.

*Primary Examiner* — Bradley R Spies
*Assistant Examiner* — Jeannie McDermott
(74) *Attorney, Agent, or Firm* — McDonald Hopkins LLC (57) ABSTRACT

An apparatus for controlling a water softener according to an exemplary embodiment of the present invention includes: a concentration detector detecting a concentration of total dissolved solids in water introduced into a channel; a voltage controller controlling a voltage applied to an electrode so that the detected concentration of the total dissolved solids reaches a target concentration; a flow rate detector detecting a flow rate of the water introduced into the channel; and a water softening time controller controlling, based on the detected flow rate, a water softening time for the water so that the detected concentration of the total dissolved solids reaches the target concentration.

15 Claims, 8 Drawing Sheets

(56) References Cited

FOREIGN PATENT DOCUMENTS

| | | | |
|---|---|---|---|
| CN | 105084472 | A | 11/2015 |
| CN | 105948176 | A | 9/2016 |
| CN | 207684988 | U | 8/2018 |
| CN | 108732322 | A | 11/2018 |
| CN | 110156179 | A | 8/2019 |
| CN | 110240234 | A | 9/2019 |
| KR | 10-2012-0132347 | A | 12/2012 |
| KR | 10-2014-0111090 | A | 9/2014 |
| KR | 20140111090 | A * | 9/2014 |
| KR | 10-2016-0082744 | A | 7/2016 |
| KR | 10-2018-0135671 | A | 12/2018 |
| KR | 10-2019-0067569 | A | 6/2019 |
| KR | 10-2019-0111276 | A | 10/2019 |

* cited by examiner

APPARATUS AND METHOD FOR CONTROLLING WATER SOFTENER

CROSS-REFERENCE TO RELATED APPLICATIONS

This U.S. non-provisional patent application claims priority under 35 U.S.C. § 119 of Korean Patent Application No. 10-2019-0131716 filed on Oct. 22, 2019 and No. 10-2020-0124816, filed on Sep. 25, 2020, the entire contents of which are hereby incorporated by reference.

TECHNICAL FIELD

The present invention relates to an apparatus and method for controlling a water softener that is operated by an electro-deionization manner.

BACKGROUND ART

An operation efficiency of a water softener is affected by an introduced water pressure, water quality, power consumption, and the like. Therefore, the operation efficiency of the water softener may change depending on an installation area and environment. That is, the water softener needs to be controlled by an operation method suitable for the installation area and environment.

However, the water softener according to the related art uses a high voltage without a separate voltage control only for performance improvement in an electro-deionization method (for example, capacitive deionization (CDI)). Therefore, in the operation method of the water softener according to the related art, power is wasted and thus economic efficiency deteriorates, which is problematic.

In addition, in the water softener according to the related art, a water softening time is not controlled and water softening and regeneration are repeated only for the duration. As a result, the amount of water used for water softening and the amount of wasted water are similar to each other, which inevitably causes a decrease in recovery rate.

DISCLOSURE

Technical Problem

The present invention has been made in an effort to solve the above-described problems, and an object of the present invention is to provide an apparatus and method for controlling a water softener, in which a voltage applied to an electrode may be controlled according to the concentration of total dissolved solids in water introduced into a channel, and a water softening time may be controlled according to a flow rate, thereby improving energy efficiency and maintaining a high recovery rate.

Technical Solution

An apparatus for controlling a water softener according to an exemplary embodiment of the present invention includes: a concentration detector detecting a concentration of total dissolved solids (TDS) in water introduced into a channel; a voltage controller controlling a voltage applied to an electrode so that the detected concentration of the total dissolved solids reaches a target concentration; a flow rate detector detecting a flow rate of the water introduced into the channel; and a water softening time controller controlling, based on the detected flow rate, a water softening time for the water so that the detected concentration of the total dissolved solids reaches the target concentration.

A method for controlling a water softener according to an exemplary embodiment of the present invention includes: detecting a concentration of total dissolved solids in water introduced into a channel; controlling a voltage applied to an electrode so that the detected concentration of the total dissolved solids reaches a target concentration; detecting a flow rate of the water introduced into the channel; and controlling, based on the detected flow rate, a water softening time for the water so that the detected concentration of the total dissolved solids reaches the target concentration.

Advantageous Effects of Invention

With the apparatus and method for controlling a water softener according to the present invention, it is possible to improve energy efficiency of the water softener and maintain a high recovery rate by controlling a voltage applied to an electrode and a water softening time.

BEST MODE

Hereinafter, various exemplary embodiments of the present invention will be described in detail with reference to the accompanying drawings. The same reference numerals will be used to describe the same components throughout the accompanying drawings, and an overlapped description of the same components will be omitted.

Specific structural and functional descriptions will be provided only in order to describe various exemplary embodiments of the present invention disclosed in the present specification. Therefore, various exemplary embodiments of the present invention may be implemented in various forms, and the present invention is not to be interpreted as being limited to exemplary embodiments described in the present specification.

Expressions "first", "second", or the like, used in various exemplary embodiment may indicate various components regardless of a sequence and/or importance of the components, and do not limit the corresponding components. For example, the "first" component may be named the "second" component, and vice versa, without departing from the scope of the present invention.

Terms used in the present specification are used only in order to describe a specific exemplary embodiment rather than limiting the range of other exemplary embodiments. Singular forms used herein may be intended to include plural forms unless context explicitly indicates otherwise.

It is to be understood that all the terms used in the present specification including technical and scientific terms may have the same meaning as those that are understood by those skilled in the art. It is to be understood that the terms defined by the dictionary may have meanings that are the same as or similar to those within the context of the related art, and they should not be ideally or excessively formally defined unless the context clearly dictates otherwise. In some cases, even the terms defined in the present specification may not be interpreted to exclude exemplary embodiments of the present invention.

Figure 1A:
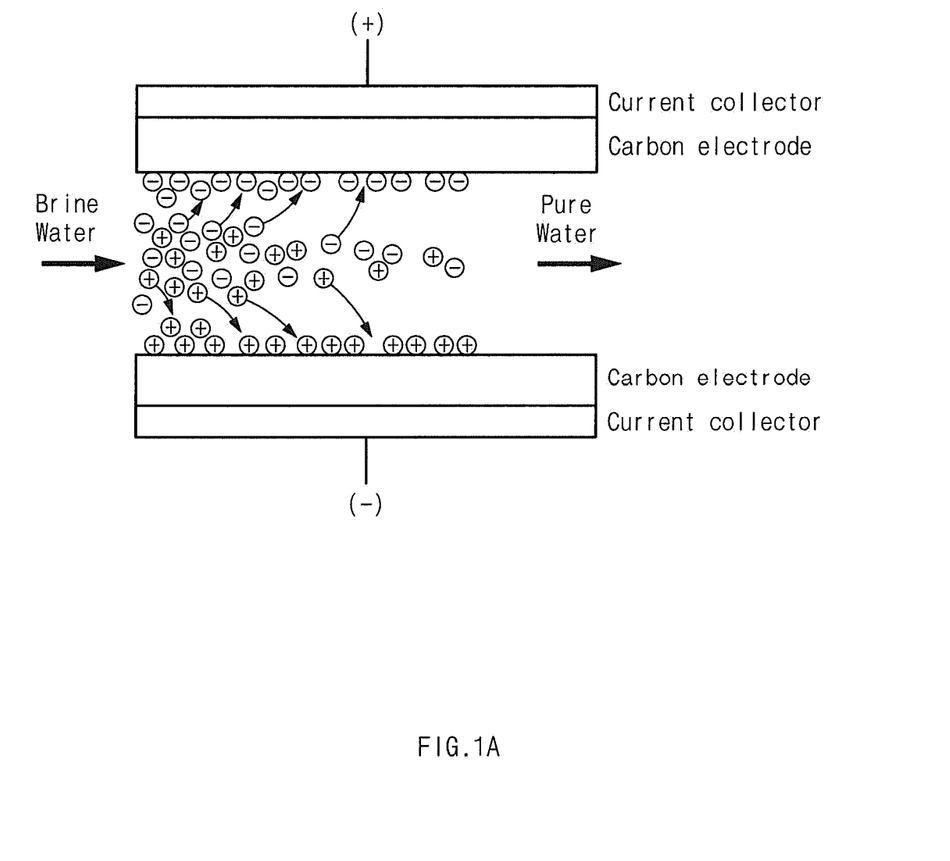
FIG. 1A is a concept diagram for describing a principle based on which an ion is removed in a capacitive deionization (CDI) method.
Figure 1B:
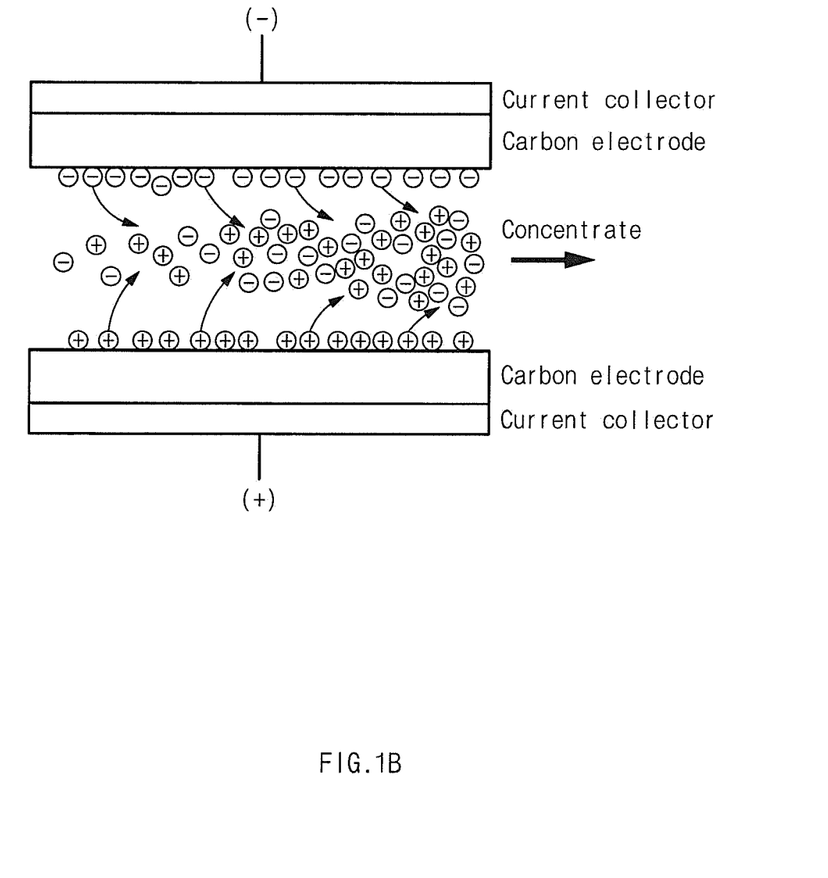
FIG. 1B is a concept diagram for describing a principle based on which an electrode is regenerated in the CDI method.

FIG. 1A is a concept diagram for describing a principle based on which an ion is removed in a capacitive deionization (CDI) method which is one of electro-deionization methods, and FIG. 1B is a concept diagram for describing a principle based on which an electrode is regenerated in the CDI method.

When a direct current (DC) voltage is applied to a charged particle in an electrolyte, a positively-changed particle moves to a negative electrode, and a negatively-charged particle moves to a positive electrode, which is called electrophoresis. The electro-deionization method refers to a method in which an ion (ionic material) in water is selectively removed based on a principle of an electric force (electrophoresis).

Examples of the electro-deionization method include electrodialysis (ED), electro deionization (EDI), continuous electro deionization (CEDI), and capacitive deionization (CDI). A filter unit used in the ED includes an electrode and an ion-exchange membrane. A filter unit used in the EDI includes an electrode, an ion-exchange membrane, and an ion-exchange resin. A filter unit used in the CDI includes only an electrode or includes an electrode and an ion-exchange membrane.

A filter unit according to an exemplary embodiment of the present invention may remove an ionic material by using the CDI which is one of the electro-deionization methods. The CDI refers to a method of removing an ion by using a principle that an ion (or ionic material) is adsorbed and desorbed onto and from a surface of an electrode.

The water softener according to an exemplary embodiment of the present invention will be described with an example in which an ionic material is removed by using the CDI which is one of the electro-deionization methods. However, this is only an example, and the present invention is not limited to the CDI. Various electro-deionization methods described above may be applied to the water softener according to an exemplary embodiment of the present invention.

In general, the CDI refers to a method of removing an ion by using a principle that an ion (or ionic material) is adsorbed and desorbed onto and from a surface of an electrode.

Referring to FIG. 1, when raw water containing ions passes between electrodes in a state where a voltage is applied to the electrodes, a negative ion moves to a positive electrode, and a positive ion moves to a negative electrode. That is, adsorption occurs. The ions may be removed from the raw water by such adsorption. Hereinafter, a mode in which the ion (ionic material) is removed as described above will be referred as a removal mode.

However, an adsorptive capacity of the electrode is limitative. Therefore, when the adsorption continues, ions may not be adsorbed onto the electrode anymore. In order to prevent such a problem, it is necessary to regenerate the electrode by desorbing the ion adsorbed onto the electrode as illustrated in FIG. 1B. To this end, a reverse voltage in the removal mode may be applied to the electrode, or a voltage may not be applied. Hereinafter, a mode in which the electrode is regenerated as described above will be referred to as a regeneration mode. The regeneration mode may be performed before or after the removal mode, and a time interval between the regeneration mode and the removal mode may be set to various values.

Figure 2:
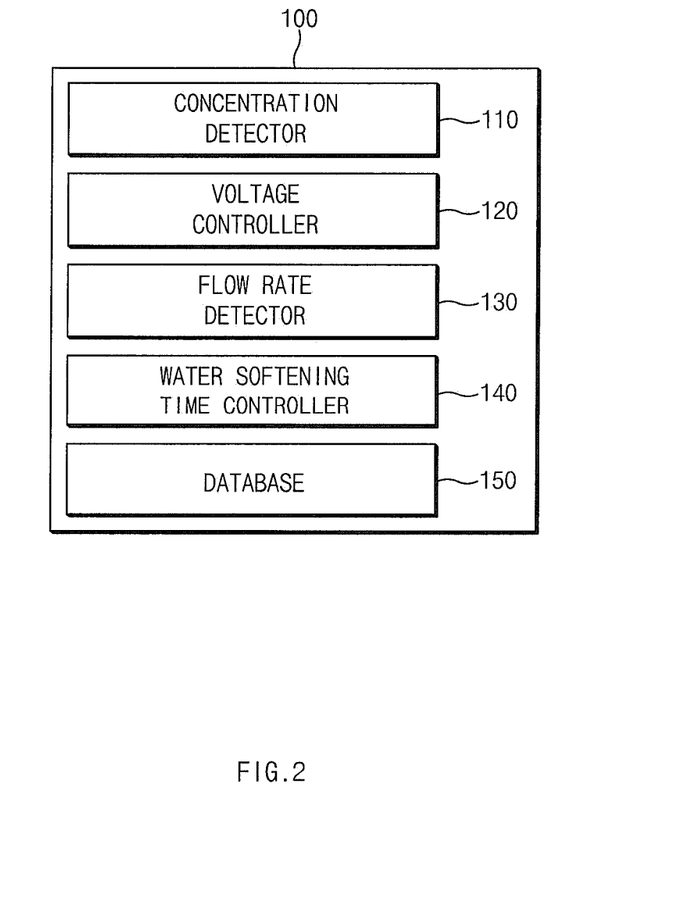
FIG. 2 is a block diagram of an apparatus for controlling a water softener according to an exemplary embodiment of the present invention.

FIG. 2 is a block diagram of an apparatus for controlling a water softener according to an exemplary embodiment of the present invention.

Referring to FIG. 2, an apparatus 100 for controlling a water softener according to an exemplary embodiment of the present invention may include a concentration detector 110, a voltage controller 120, a flow rate detector 130, a water softening time controller 140, and a database 150. Hereinafter, a case where the apparatus for controlling a water softener according to the exemplary embodiment of the present invention is applied to the CDI will be described. However, the present invention is not limited to the CDI, and various electro-deionization methods described above may be applied to the water softener according to the exemplary embodiment of the present invention.

The concentration detector 110 may detect the concentration of total dissolved solids (TDS) in water introduced into a channel. Here, the total dissolved solids refers to the total amount of an ionic material or organic material such as calcium, magnesium, potassium, chlorine, a sulfuric acid, or a carbonate ion.

The voltage controller 120 may control a voltage applied to an electrode onto which an ionic material contained in water is adsorbed so that the concentration of the total dissolved solids detected by the concentration detector 110 reaches a target concentration.

Generally, in the electro-deionization method, the higher the voltage applied to the used electrode is, the stronger the adsorption of the ionic material is made. Therefore, when the voltage applied to the electrode is increased by the voltage controller 120, the ionic material is actively adsorbed, and when the voltage is decreased, the ionic material is less actively adsorbed.

In addition, the voltage controller 120 may control a voltage applied to an electrode to be a minimum voltage required for making the concentration of the total dissolved solids reach the target concentration within a preset time. As described above, the higher the voltage applied to the electrode, the stronger the adsorption of the ionic material is made. Therefore, although water softening in the water softener is actively performed, energy consumption is inevitably high because a high voltage is applied.

In this regard, with the voltage controller 120, the water softening may be performed with a minimum voltage required for making the concentration reach the target concentration within the predetermined time, thereby minimizing power consumption.

The flow rate detector 130 may detect the flow rate of the water introduced into the channel. In general, as the flow rate of the introduced water is increased, the amount of the ionic material adsorbed onto a deionization electrode is decreased. As such, the flow rate of the water affects the deionization performance of the electrode. Therefore, it is necessary to detect the flow rate using the flow rate detector 130 in order to control the water softener.

The water softening time controller 140 may control a water softening time for the water so that the concentration of the total dissolved solids detected based on the flow rate detected by the flow rate detector 130 reaches the target concentration. That is, the water softening time controller 140 may perform a control to decrease the water softening time when the flow rate of the introduced water is high, and may perform a control to increase the water softening time when the flow rate of the introduced water is low, thereby improving efficiency in water softening.

In addition, the water softening time controller 140 may control the water softening time for the water to be a maximum water softening time required for making the detected concentration of the total dissolved solids reach the target concentration at the voltage applied to the electrode by the voltage controller 120.

That is, the water softening time controller 140 may secure the maximum water softening time within which the concentration of the total dissolved solids reaches the target concentration at a specific voltage, thereby minimizing the amount of water wasted without being used and increasing a recovery rate.

The database 150 may store a minimum voltage required for making each concentration of the total dissolved solids reach the target concentration within the preset time, and a maximum water softening time required for making each concentration of the total dissolved solids reach the target concentration at a preset voltage. That is, values of the minimum voltage and the maximum water softening time required for making each concentration reach the target concentration may be stored in the database 150.

Further, the database 150 may store, for each concentration of the total dissolved solids and each flow rate in the channel, information on a water softening time (for example, the maximum water softening time) according to a voltage applied to the electrode. That is, the database 150 may store data of a water softening time according to a voltage applied to the electrode to control the concentration of the total dissolved solids in a case where each of the concentration of the total dissolved solids and the flow rate in the channel changes.

For example, in the database 150, the water softening time may be set so that the water softening time is longer when the flow rate is low than when the flow rate is high, at the same concentration of the total dissolved solids. Further, the database 150 may store a table indicating that, at the same concentration of the total dissolved solids and the same flow rate, a voltage lower than an initial voltage is applied and a preset water softening time is applied, or the initial voltage is applied and a water softening time is increased. Therefore, it is possible to extract, from the data stored in the database 150, information on a possible water softening time at a specific voltage for a desired concentration of the total dissolved solids and a desired flow rate in the channel.

Meanwhile, FIG. 2 illustrates a case that the apparatus 100 for controlling a water softener according to the exemplary embodiment of the present invention includes the database 150, but the present invention is not limited thereto. An external server may include a separate database, and data may be received through a communication unit (not illustrated) of the apparatus 100 for controlling a water softener.

As such, with the apparatus 100 for controlling a water softener, a voltage applied to the electrode may be controlled according to the concentration of total dissolved solids in water introduced into the channel, and a water softening time may be controlled according to a detected flow rate, thereby improving energy efficiency and maintaining a high recovery rate.

Specifically, in the apparatus 100 for controlling a water softener according to the exemplary embodiment of the present invention, in a case where the concentration of the total dissolved solids detected by the concentration detector 110 is equal to or higher than the reference concentration, and the flow rate detected by the flow rate detector 130 is equal to or higher than a preset reference flow rate, the voltage controller 120 may maintain the voltage applied to the electrode at an initial value so that the detected concentration of the total dissolved solids reaches the target concentration, and the water softening time controller 140 may perform a control to maintain the water softening time for the water at a maximum water softening time required for making the concentration of the total dissolved solids reach the target concentration at a corresponding voltage.

That is, when the flow rate in the channel exceeds a certain level, there may be no sufficient time for the ionic material to be adsorbed onto the electrode, and it may be difficult to control the water softening time. Therefore, in the apparatus 100 for controlling a water softener according to the exemplary embodiment of the present invention, at the reference flow rate or higher, for example, the water softening time is maintained at the maximum water softening time required for making each concentration of the total dissolved solids reach the target concentration, the maximum water softening time being stored in the database 150, and the voltage applied to the electrode is maintained at the initial value, such that the concentration of the total dissolved solids (TDS) reaches the target concentration.

Meanwhile, in a case where the concentration of the total dissolved solids detected by the concentration detector 110 is equal to or higher than the reference concentration, and the flow rate detected by the flow rate detector 130 is lower than the reference flow rate, the voltage controller 120 may maintain the voltage applied to the electrode at the initial value, and the water softening time controller 140 may perform a control to increase the water softening time required for making the detected concentration of the total dissolved solids reach the target concentration.

That is, when the flow rate in the channel is equal to or lower than a certain level, it is more efficient to control the water softening time than the voltage applied to the electrode, in terms of energy consumption. Therefore, in the apparatus 100 for controlling a water softener according to the exemplary embodiment of the present invention, at a flow rate lower than the reference flow rate, the voltage may be maintained at the initial value so that each concentration of the total dissolved solids that is stored in the database 150 reaches the target concentration, and the water softening time may be increased such that the concentration of the total dissolved solids (TDS) reaches the target concentration, thereby improving energy efficiency.

Meanwhile, in the apparatus 100 for controlling a water softener according to the exemplary embodiment of the present invention, in a case where the concentration of the total dissolved solids detected by the concentration detector 110 is lower than the reference concentration, the voltage controller 110 may maintain the voltage applied to the electrode at the initial value so that the detected concentration of the total dissolved solids reaches the target concentration, and the water softening time controller 140 may perform a control to increase the water softening time for the water.

Alternatively, in a case where the concentration of the total dissolved solids detected by the concentration detector 110 is lower than the reference concentration, instead of increasing the water softening time, the voltage controller 110 may decrease the voltage applied to the electrode so that the detected concentration of the total dissolved solids reaches the target concentration, and the water softening time controller 140 may maintain the water softening time for the water.

That is, in a case where the concentration of the total dissolved solids in water introduced into the channel is low, the voltage may be maintained constant and the water softening time may be adjusted, or the voltage may be decreased and the water softening time may be maintained, such that the concentration of the total dissolved solids reaches the target concentration, thereby increasing the recovery rate.

As such, in the apparatus 100 for controlling a water softener according to the exemplary embodiment of the present invention, in a case where the concentration of the total dissolved solids is equal to or higher than the reference concentration, the initial voltage may be maintained so that the concentration of the total dissolved solids reaches the target concentration at a specific flow rate or higher of the introduced water, and in a case where the flow rate of the introduced water is lower than the specific flow rate, the water softening time may be increased while applying a specific voltage (that is, a voltage for each feed TDS according to the target TDS concentration at the reference flow rate), thereby further improving power efficiency. Further, in a case where the concentration of the total dissolved solids is lower than the reference concentration, the voltage may be maintained at a specific value and the water softening time may be increased, or the voltage may be decreased and the water softening time may be maintained, thereby increasing the recovery rate.

Figure 3:
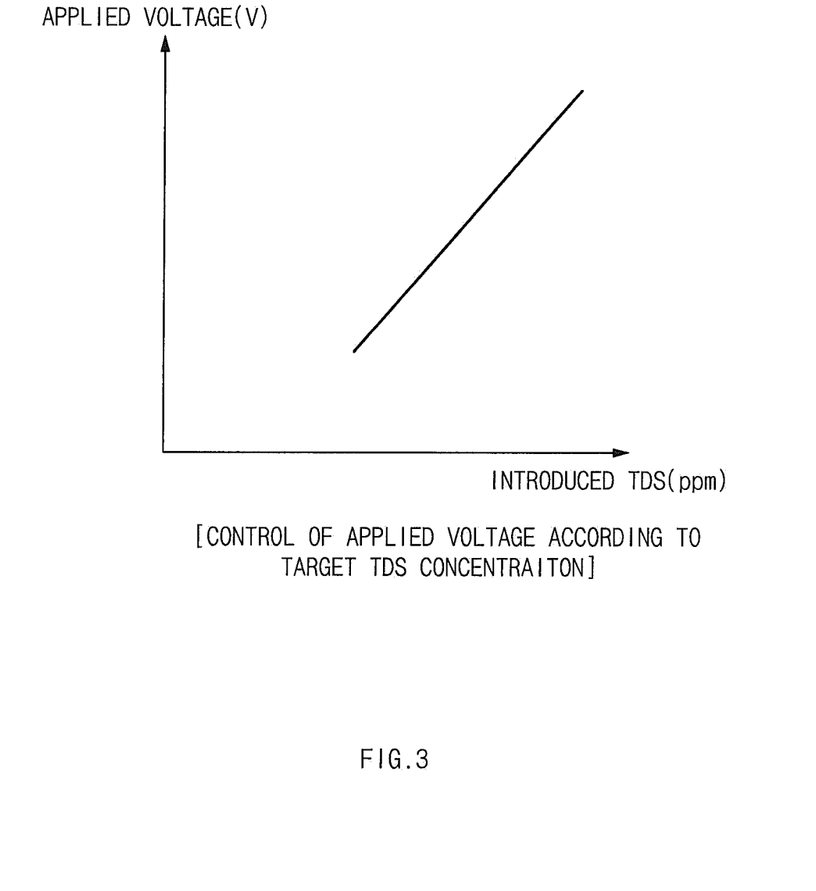
FIG. 3 is a diagram illustrating a result obtained in a voltage control method of the apparatus for controlling a water softener according to an exemplary embodiment of the present invention.

FIG. 3 is a diagram illustrating a result obtained in a voltage control method of the apparatus for controlling a water softener according to the exemplary embodiment of the present invention.

FIG. 3 illustrates a result obtained by measuring a minimum voltage required for making the concentration of the total dissolved solids in water reach the target concentration within a reference time while maintaining the water softening time and a regeneration time, the concentration of the total dissolved solids being in a specific range.

Referring to the graph of FIG. 3, it may be seen that the higher the initial concentration of the total dissolved solids, the higher the voltage required for making the concentration of the total dissolved solids reach the target concentration in a specific time. That is, when the concentration of the total dissolved solids is increased, the amount of the ionic material to be adsorbed onto the electrode is increased. In this case, a relatively strong electric attraction is required, and thus the voltage needs to be increased.

As such, with the apparatus 100 for controlling a water softener according to the exemplary embodiment of the present invention, a (minimum) voltage required for making each concentration reach the target concentration in a specific time is measured in advance and stored in the database, such that electro-deionization may be made with a voltage suitable for the concentration detected by the concentration detector. As a result, power consumption for water softening is significantly reduced, thereby improving energy efficiency.

Figure 4:
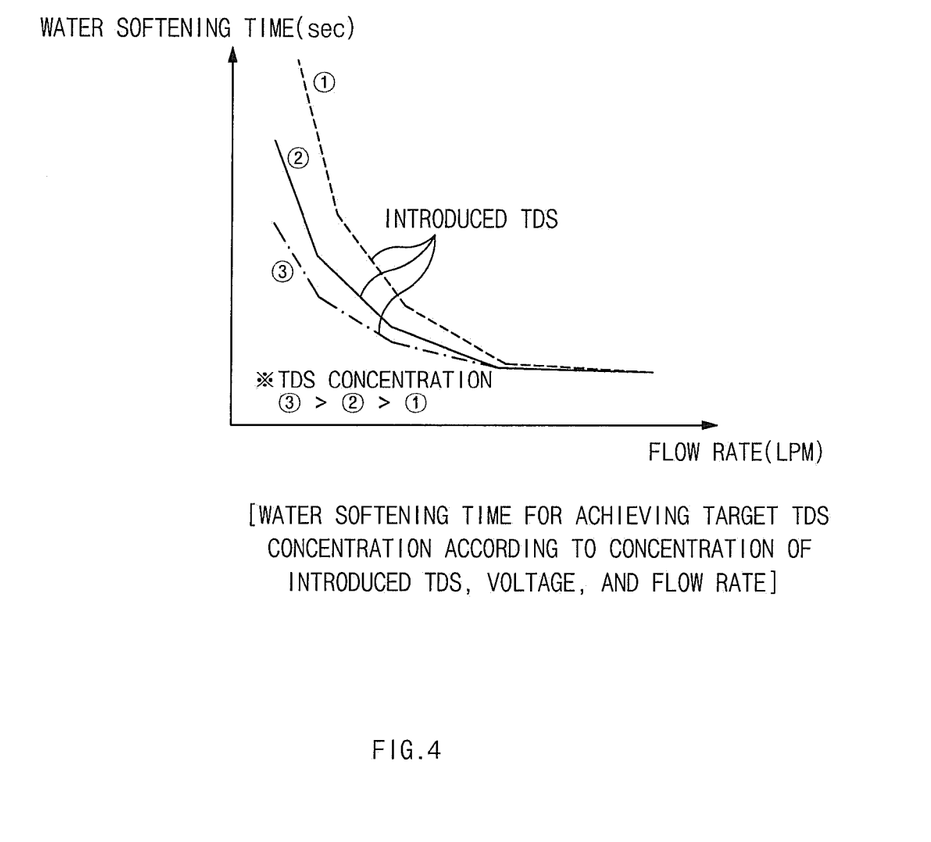
FIG. 4 is a diagram illustrating a result obtained in a water softening time control method of the apparatus for controlling a water softener according to an exemplary embodiment of the present invention.

FIG. 4 is a diagram illustrating a result obtained in a water softening time control method of the apparatus for controlling a water softener according to the exemplary embodiment of the present invention.

Similar to FIG. 3, FIG. 4 illustrates a result obtained by measuring a maximum water softening time required for making the concentration of the total dissolved solids in water reach the target concentration while maintaining the water softening time and the regeneration time, the concentration of the total dissolved solids being in a specific range.

Referring to FIG. 4, it may be seen that as the flow rate becomes smaller than the reference flow rate, the water softening time is increased at a voltage for achieving the target TDS concentration for each feed TDS at the reference flow rate. Therefore, in a case where the amount of introduced water is small in a state in which the regeneration time is maintained, the water softening time is relatively increased. As a result, the recovery rate may be increased.

As such, with the apparatus 100 for controlling a water softener according to the exemplary embodiment of the present invention, a (maximum) water softening time required for making each concentration reach the target concentration at a voltage for achieving a target TDS concentration for each feed TDS at the reference flow rate in a specific time is measured in advance and stored in the database, such that electro-deionization may be made with a water softening time suitable for the flow rate detected by the flow rate detector. Therefore, in a case where the flow rate is low, since the water softening time is relatively increased, the amount of water subjected to the water softening becomes larger than the amount of wasted water. As a result, the recovery rate may be increased.

Figure 5:
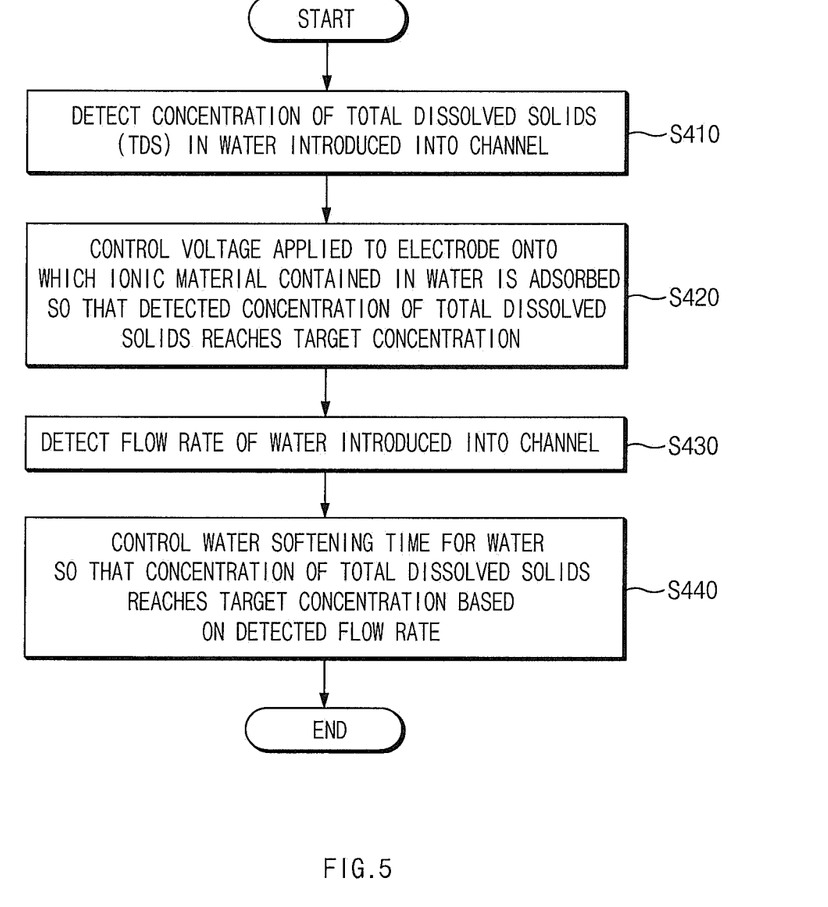
FIG. 5 is a flowchart of a method for controlling a water softener according to an exemplary embodiment of the present invention.

FIG. 5 is a flowchart of a method for controlling a water softener according to an exemplary embodiment of the present invention.

Referring to FIG. 5, first, the concentration of the total dissolved solids (TDS) in water introduced into the channel is detected (S410).

Then, a voltage applied to the electrode onto which the ionic material contained in the water is adsorbed is controlled so that the detected concentration of the total dissolved solids reaches the target concentration (S420). Here, in S420, the voltage applied to the electrode may be controlled to be a minimum voltage required for making the concentration of the total dissolved solids reach the target concentration within a preset time.

Next, the flow rate of the water introduced into the channel is detected (S430). Then, a water softening time for the water is controlled so that the detected concentration of the total dissolved solids reaches the target concentration based on the detected flow rate (S440). Here, in S440, the water softening time for the water may be controlled to be a maximum water softening time required for making the concentration of the total dissolved solids reach the target concentration at the voltage applied to the electrode.

Meanwhile, in FIG. 5, after measuring the concentration of the total dissolved solids introduced into the channel and controlling the voltage (S410 and S420), the flow rate is measured and the water softening time is controlled (S430 and S440). However, the present invention is not limited thereto. The water softening may be performed in a manner in which after measuring the flow rate of introduced water and controlling the water softening time, the concentration of the total dissolved solids is measured and the voltage is controlled. Further, the target concentration of the total dissolved solids to be removed may be adjusted by controlling the voltage (S420) or controlling the water softening time (S440).

As such, with the method for controlling a water softener, a voltage applied to the electrode may be controlled according to the concentration of total dissolved solids in water introduced into the channel, and a water softening time may be controlled according to a flow rate, thereby improving energy efficiency and maintaining a high recovery rate.

Figure 6:
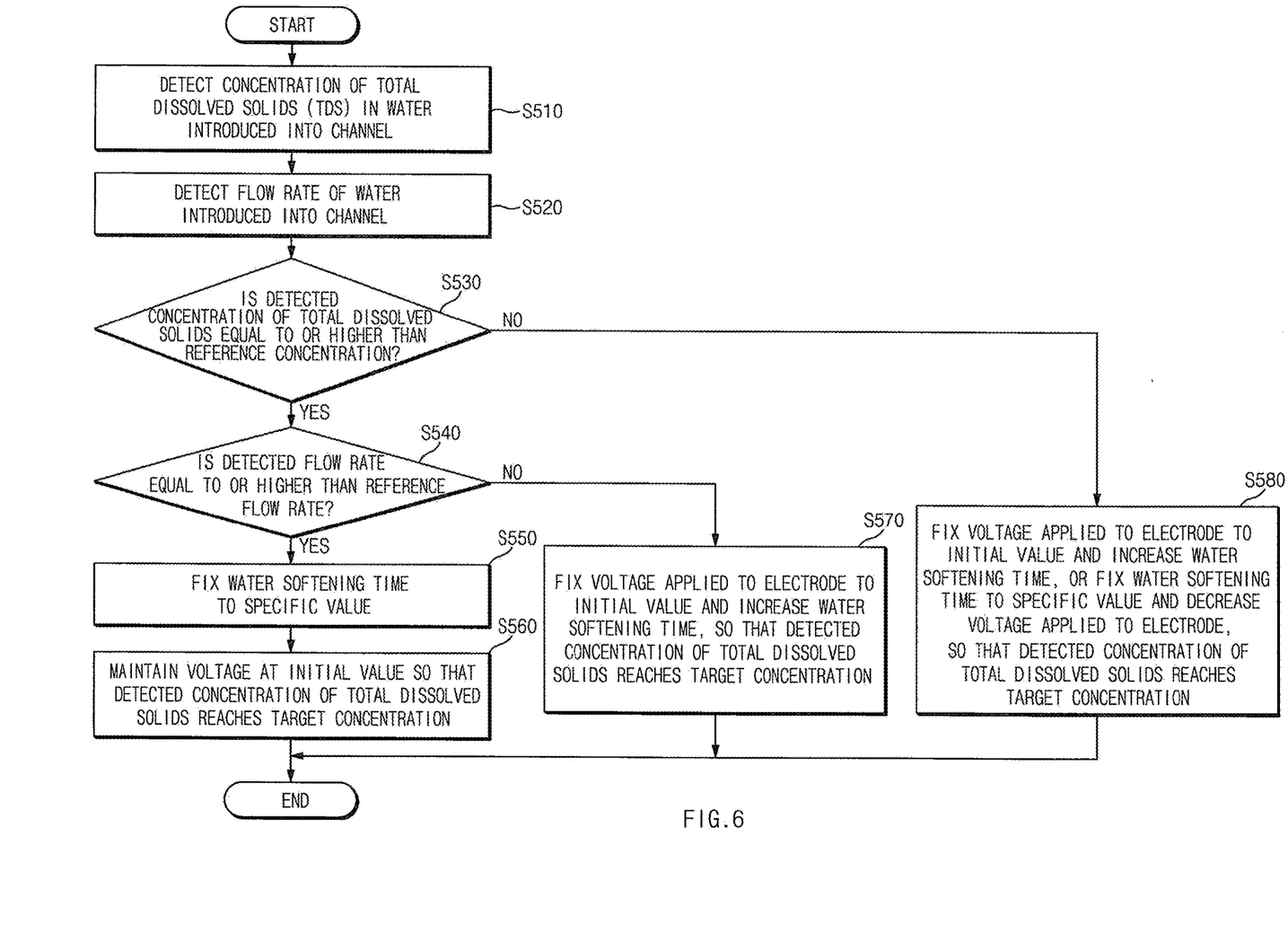
FIG. 6 is a flowchart of a method for controlling a water softener according to another exemplary embodiment of the present invention.

FIG. 6 is a flowchart of a method for controlling a water softener according to another exemplary embodiment of the present invention.

Referring to FIG. 6, first, the concentration of the total dissolved solids (TDS) in water introduced into the channel is detected (S510). Then, the flow rate of the water introduced into the channel is detected (S520). Next, it is determined whether or not the concentration of the total dissolved solids detected in S510 is equal to or higher than the reference concentration (S530). In a case where the detected concentration of the total dissolved solids is lower than the reference concentration (NO), the method may proceed to S580 to maintain the voltage applied to the electrode at the initial value so that the detected concentration of the total dissolved solids reaches the target concentration and increase the water softening time, or to maintain the water softening time at a specific value and decrease the voltage applied to the electrode.

In a case where the detected concentration of the total dissolved solids is equal to or higher than the reference concentration (YES), the method proceeds to S540 to determine whether or not the detected flow rate is equal to or higher than the reference flow rate (S540). In a case where the detected flow rate is equal to or higher than the reference flow rate (YES), the water softening time is maintained at a specific value (S550), and the voltage applied to the electrode is maintained at the initial value so that the detected concentration of the total dissolved solids reaches the target concentration (S560).

In a case where the detected flow rate is lower than the reference flow rate (NO), the voltage applied to the electrode is maintained at the initial value (S570), and the water softening time for the water is increased so that the detected concentration of the total dissolved solids reaches the target concentration (S580).

As such, in the method for controlling a water softener according to the exemplary embodiment of the present invention, in a case where the concentration of the total dissolved solids is equal to or higher than the reference concentration, the initial voltage may be maintained so that the concentration of the total dissolved solids reaches the target concentration at a specific flow rate or higher of the introduced water, and in a case where the flow rate of the introduced water is lower than the specific flow rate, the water softening time may be increased while applying a specific voltage (that is, a voltage for each feed TDS according to the target TDS concentration at the reference flow rate), thereby further improving power efficiency. Further, in a case where the concentration of the total dissolved solids is lower than the reference concentration, the voltage may be maintained at a specific value and the water softening time may be increased, or the voltage may be decreased and the water softening time may be maintained, thereby improving the recovery rate.

Figure 7:
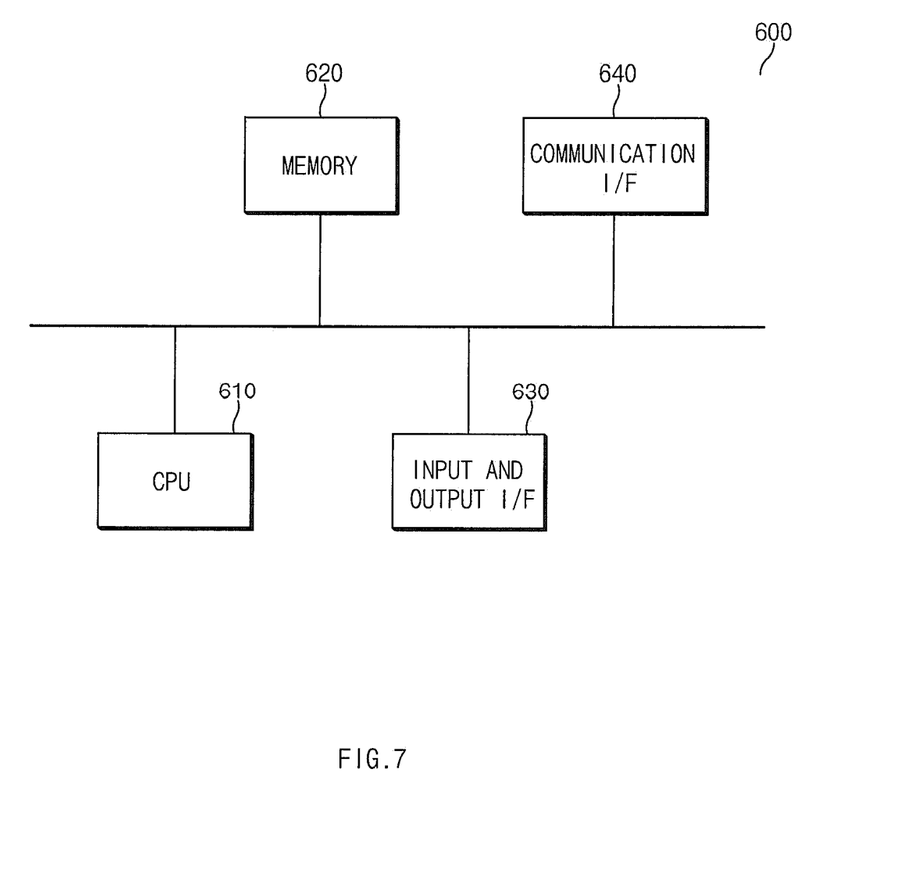
FIG. 7 illustrates a hardware configuration of an apparatus for controlling a water softener according to an exemplary embodiment of the present invention.

FIG. 7 illustrates a hardware configuration of an apparatus for controlling a water softener according to an exemplary embodiment of the present invention.

Referring to FIG. 7, an apparatus 600 for controlling a water softener according to an exemplary embodiment of the present disclosure may include a control processing unit (CPU) 610, a memory 620, an input and output I/F 630, and a communication I/F 640.

The CPU 610 may control various processing and each component of the apparatus 600 for controlling a water softener. That is, the CPU 610 may be a processor that executes a water softener control program stored in the memory 620, processes various data for the water softener control program, and performs functions of the apparatus for controlling a water softener.

In, the memory 620, an operating system program and various programs (for example, the water softener control program) may be recorded. Here, examples of the memory 620 may include a volatile memory such as a random access memory (RAM), a dynamic RAM (DRAM), or a static RAM (SRAM), and a non-volatile memory such as a read only memory (ROM), a programmable ROM (PROM), an electrically alterable ROM (EAROM), an erasable PROM (EPROM), an electrically erasable PROM (EEPROM), or a flash memory. However, the memories 620 listed above are only examples, and the memory 620 is not limited thereto.

The input and output I/F 630 may connect an input device (not illustrated) such as a keyboard, a mouse, or a touch panel, an output device such as a display (not illustrated), and the CPU 610 to enable transmission and reception of data.

The communication I/F 640 may enable communication with the outside (for example, a higher-level controller) through a wired or wireless communication network.

As such, a computer program according to the present invention may be recorded in the memory 620, and processed by the CPU 610, thereby being implemented as a module that performs the respective functional blocks illustrated in FIG. 2.

Meanwhile, although a case where all the components configuring an exemplary embodiment of the present invention are combined with each other as one component or are combined and operated with each other has been described, the present invention is not necessarily limited thereto. That is, all the components may also be selectively combined and operated with each other as one or more components without departing from the scope of the present invention.

In addition, hereinabove, the terms "include", "configure", "have", or the like, are to be interpreted to imply the inclusion of other components rather than the exclusion of other components, since they mean that a corresponding component may be included unless particularly described otherwise. Unless defined otherwise, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present invention.

The spirit of the present invention has been illustratively described hereinabove. It will be appreciated by those skilled in the art that various modifications and alterations may be made without departing from the essential characteristics of the present invention. Accordingly, the exemplary embodiments disclosed in the present invention are not to limit the present invention, but are to describe the spirit of the present invention.

The scope of the present invention is not limited only to the exemplary embodiments. The scope of the present invention should be interpreted by the following claims and it should be interpreted that all spirits equivalent to the following claims fall within the scope of the present invention.

REFERENCE SIGNS LIST 100, 600: Apparatus for controlling water softener
110: Concentration detector
120: Voltage controller
130: Flow rate detector
140: Water softening time controller
150: Database
610: CPU
620: Memory
630: Input and output I/F
640: Communication I/F

The invention claimed is:

1. An apparatus for controlling a water softener, the apparatus comprising:
a concentration detector detecting a concentration of total dissolved solids (TDS) in water introduced into a channel;
a voltage controller controlling a voltage applied to an electrode so that the detected concentration of the total dissolved solids reaches a target concentration;
a flow rate detector detecting a flow rate of the water introduced into the channel; and
a water softening time controller controlling, based on the detected flow rate, a water softening time for the water so that the detected concentration of the total dissolved solids reaches the target concentration; and
a database storing, for each concentration of the total dissolved solids and each flow rate in the channel, the water softening time for the water according to a voltage applied to the electrode,
wherein the voltage controller controls the voltage applied to the electrode to be a minimum voltage required for making the concentration of the total dissolved solids reach the target concentration within a preset time, and
wherein the water softening time controller controls the water softening time for the water to be a maximum water softening time required for making the detected concentration of the total dissolved solids reach the target concentration at the voltage applied to the electrode by the voltage controller, thereby minimizing the amount of water wasted and increasing a recovery rate.

2. The apparatus of claim 1, wherein in a case where the concentration of the total dissolved solids detected by the concentration detector is equal to or higher than a reference concentration, and the flow rate detected by the flow rate detector is equal to or higher than a reference flow rate, the voltage controller maintains the voltage applied to the electrode at an initial value, and the water softening time controller maintains the water softening time for the water at a preset value, so that the detected concentration of the total dissolved solids reaches the target concentration.

3. The apparatus of claim 1, wherein in a case where the concentration of the total dissolved solids detected by the concentration detector is equal to or higher than a reference concentration, and the flow rate detected by the flow rate detector is lower than a reference flow rate, the voltage controller maintains the voltage applied to the electrode at an initial value, and the water softening time controller controls the water softening time for the water, so that the detected concentration of the total dissolved solids reaches the target concentration.

4. The apparatus of claim 1, wherein in a case where the concentration of the total dissolved solids detected by the concentration detector is lower than a reference concentration, the voltage controller maintains the voltage applied to the electrode at an initial value, and the water softening time controller controls the water softening time for the water so that the detected concentration of the total dissolved solids reaches the target concentration.

5. The apparatus of claim 1, wherein in a case where the concentration of the total dissolved solids detected by the concentration detector is lower than a reference concentration, the voltage controller decreases the voltage applied to the electrode and the water softening time controller maintains the water softening time for the water at a preset value, so that the detected concentration of the total dissolved solids reaches the target concentration.

6. The apparatus of claim 1, wherein the database stores a minimum voltage required for making each concentration of the total dissolved solids reach the target concentration within a preset time, and a maximum water softening time required for making each concentration of the total dissolved solids reach the target concentration at a preset voltage.

7. An apparatus for controlling a water softener, the apparatus comprising:
a concentration detector detecting a concentration of total dissolved solids (TDS) in water introduced into a channel;
a voltage controller controlling a voltage applied to an electrode so that the detected concentration of the total dissolved solids reaches a target concentration;
a flow rate detector detecting a flow rate of the water introduced into the channel; and
a water softening time controller controlling, based on the detected flow rate, a water softening time for the water so that the detected concentration of the total dissolved solids reaches the target concentration; and
a database storing, for each concentration of the total dissolved solids and each flow rate in the channel, the water softening time for the water according to a voltage applied to the electrode,
wherein the voltage controller controls the voltage applied to the electrode to be a minimum voltage required for making the concentration of the total dissolved solids reach the target concentration within a preset time, and
wherein the water softening time controller controls the water softening time for the water to be a maximum water softening time required for making the detected concentration of the total dissolved solids reach the target concentration at the voltage applied to the electrode by the voltage controller, the water softening time is increased relative to a regeneration time, thereby increasing a recovery rate.

8. The apparatus of claim 7, wherin in a case where the concentration of the total dissolved solids detected by the concentration detector is equal to or higher than a reference concentration, and the flow rate detected by the flow rate detector is equal to or higher than a reference flow rate, the voltage controller maintains the voltage applied to the electrode at an initial value, and the water softening time controller maintains the water softening time for the water at a preset value, so that the detected concentration of the total dissolved solids reaches the target concentration.

9. The apparatus of claim 7, wherein in a case where the concentration of the total dissolved solids detected by the concentration detector is equal to or higher than reference concentration, and the flow rate detected by the flow rate detector is lower than a reference flow rate, the voltage controller maintains the voltage applied to the electrode at an initial value, and the water softening time controller controls the water softening time for the water, so that the detected concentration of the total dissolved solids reaches the target concentration.

10. The apparatus of claim 7, wherein in a case where the concentration of the total dissolved solids detected by the concentration detector is lower than a reference concentration, the voltage controller maintains the voltage applied to the electrode at an initial value, and the water softening time controller controls the water softening time for the water so that the detected concentration of the total dissolved solids reaches the target concentration.

11. The apparatus of claim 7, wherein in a case where the concentration of the total dissolved solids detected by the concentration detector is lower than a reference concentration, the voltage controller decreases the voltage applied to the electrode and the water softening time controller maintains the water softening time for the water at a preset value, so that the detected concentration of the total dissolved solids reaches the target concentration.

12. The apparatus of claim 7, wherein the database stores a minimum voltage required for making each concentration of the total dissolved solids reach the target concentration within a preset time, and a maximum water softening time required for making each concentration of the total dissolved solids reach the target concentration at a preset voltage.

13. A method for controlling a water softener, the method comprising:
   detecting a concentration of total dissolved solids in water introduced into a channel;
   controlling a voltage applied to an eletrode so that the detected concentration of the total dissolved solids reaches a target concentration;
   detecting a flow rate of the water introduced into the channel; and
   controlling, based on the detected flow rate, a water softening time for the water so that the detected concentration of the total dissolved solids reaches the target concentration,
   wherein in the controlling of the water softening time, the water softening time for the water is controlled based on, for each concentration of the total dissolved solids and each flow rate in the channel, the water softening time for the water according to a voltage applied to the electrode, stored in a database, and
   wherein in the controlling of the voltage, the voltage applied to the electrode is controlled to be a minimum voltage required for making the concentration of the total dissolved solids reach the target concentration within a preset time, and wherein in the controlling of the water softening time, the water softening time for the water is controlled to be a maximum water softening time required for making the detected concentration of the total dissolved solids reach the target concentration at the voltage applied to the electrode, thereby minimizing the amount of water wasted and increasing a recovery rate.

14. The method of claim 13, further comprising maintaining the voltage applied to the electrode at an initial value and maintaining the water softening time for the water at a preset value, so that the detected concentration of the total dissolved solids reaches the target concentration, in a case where the detected concentration of the total dissolved solids is equal to or higher than a reference concentration, and the detected flow rate is equal to or higher than a reference flow rate.

15. The method of claim 13, further comprising maintaining the voltage applied to the electrode at an initial value, and controlling the water softening time for the water so that the detected concentration of the total dissolved solids reaches the target concentration, in a case where the detected concentration of the total dissolved solids is equal to or higher than a reference concentration, and the detected flow rate is lower than a reference flow rate.

* * * * *